United States Patent
Toale et al.

(10) Patent No.: US 8,954,258 B2
(45) Date of Patent: Feb. 10, 2015

(54) ELECTRONICALLY OPERATED PRESSURE REDUCING REGULATOR

(71) Applicant: Dexen Industries, Inc., Santa Fe Springs, CA (US)

(72) Inventors: Roger Mark Toale, Santa Fe Springs, CA (US); George Takahiro Suzuki, Santa Fe Springs, CA (US)

(*) Notice: Subject to any disclaimer, the term of this patent is extended or adjusted under 35 U.S.C. 154(b) by 387 days.

(21) Appl. No.: 13/632,256

(22) Filed: Oct. 1, 2012

(65) Prior Publication Data
US 2014/0090723 A1    Apr. 3, 2014

(51) Int. Cl.
*F02M 69/54*    (2006.01)

(52) U.S. Cl.
USPC ........... 701/104; 123/457; 123/458; 123/511; 123/525

(58) Field of Classification Search
CPC .............. F02M 21/0239; F02M 69/54; F02M 37/0029; F02M 2037/226; F02D 2250/31
USPC .......... 701/103, 104; 123/457, 458, 510, 511, 123/525
See application file for complete search history.

(56) References Cited

U.S. PATENT DOCUMENTS

| | | | | |
|---|---|---|---|---|
| 6,050,246 | A * | 4/2000 | Abdelmesih | 123/527 |
| 6,253,734 | B1 * | 7/2001 | Rembold et al. | 123/446 |
| 7,013,872 | B2 * | 3/2006 | Yamazaki et al. | 123/431 |

* cited by examiner

*Primary Examiner* — Hai Huynh
(74) *Attorney, Agent, or Firm* — Mark Terry (57) ABSTRACT

A pressure-reducing regulator for CNG fuel includes a high pressure sensor that detects fuel pressure at an inlet, a filter element that filters fuel, an orifice that provides access to a pressure reduction chamber, and a movable pintle located within the orifice, such that a flow rate of fuel through the orifice varies according to a position of the pintle within the orifice. The pressure-reducing regulator further includes a motor that moves the pintle, a low pressure sensor that detects fuel pressure at an outlet and a control unit comprising a processor. The process is configured for reading data from the high pressure sensor, data from the low pressure sensor and vehicle data from an engine, calculating a desired position of the pintle based on the sensor data and the vehicle data, and transmitting a signal to the motor for moving the pintle to the desired position.

19 Claims, 9 Drawing Sheets

ELECTRONICALLY OPERATED PRESSURE REDUCING REGULATOR

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of pressure-reducing regulators, and more particularly relates to the field of high pressure regulators for compressed natural gas.

BACKGROUND OF THE INVENTION

A pressure-reducing regulator, also known as a high pressure regulator, is a valve that reduces pressurized fluid or gas to a lower pressure and delivers it for consumption. The fluid or gas may be supplied, for example, from a high pressure cylinder or via a hose from a compressor. Consequently, high pressure regulators are used to allow high-pressure fluid or gas supply lines or tanks to be reduced to safe and/or usable pressures for various applications. A common application for high pressure regulators is compressed natural gas (CNG), which is a fossil fuel substitute for gasoline, diesel, or propane. CNG is a more environmentally clean fuel alternative and safer than conventional fuels in the event of a spill. CNG is typically stored and distributed in hard containers at a pressure of 3600 psi, usually in cylindrical or spherical shapes. Recent advancements in technology have resulted in CNG being used as fuel for traditional gasoline internal combustion engine vehicles that have been converted for CNG consumption.

Conventional high pressure regulators utilize a well-known diaphragm and spring mechanism to regulate pressure and flow. U.S. Pat. No. 5,443,083, for example, discloses a pressure-reducing regulator for CNG including a diaphragm and spring mechanism. This design, however, inherently causes the regulator to "droop" or cause an undesirable drop in the outlet pressure and flow. The well-known droop phenomenon is caused by high demand from the outlet port causing the pressure to drop while waiting for the diaphragm and spring to overcome the pressure drop and increase the opening at the pressure reduction orifice. In short, when there is an increased need for fuel (such as in response to a gas pedal push in a motor vehicle implementation), the diaphragm and spring design exhibits a time delay in meeting the increased fuel need. This can be disadvantageous in a vehicle implementation where drivers expect immediate responses to pedal commands. Further, the droop phenomenon can negatively affect the emissions of an internal combustion engine.

Another well-known drawback of conventional high pressure regulators involves the overly-simplistic manner in which pressure is regulated. In a standard diaphragm and spring-design regulator, the diaphragm and spring components react solely to the amount of pressure the components experience. Thus, the regulator functions performed by standard diaphragm and spring-design regulators are dictated solely by current pressure conditions, such as the level of in-bound gas pressure. Other known approaches to high pressure regulator design may allow other data to be taken into account while performing regulator functions. U.S. Pat. No. 6,889,705, for example, discloses regulator functions that are dictated by fuel flow conditions. Internal combustion engine vehicles, however, involve a multitude of complex systems that are affected by a plethora of conditions and data. The currently available high pressure regulators, however, do not adequately account for the many relevant factors when performing regulator functions.

Therefore, a need exists to overcome the problems with the prior art as discussed above, and particularly for a more efficient high pressure regulator that provides a desirable pressure and flow, and takes various relevant factors into account when performing regulator functions.

SUMMARY OF THE INVENTION

Briefly, according to one embodiment, a pressure-reducing regulator for compressed natural gas (CNG) fuel is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

The pressure-reducing regulator for CNG fuel includes a high pressure sensor that detects fuel pressure at an inlet for ingress of fuel into the regulator, a filter element that filters fuel from the inlet, an orifice for accepting ingress of fuel from the filter element, wherein the orifice provides access to a pressure reduction chamber, and a movable pintle located within the orifice, such that a flow rate of fuel through the orifice varies according to a position of the pintle within the orifice. The pressure-reducing regulator further includes a motor that moves the pintle within the orifice, a low pressure sensor that detects fuel pressure at an outlet for egress of fuel out of the regulator and a control unit comprising a processor. The process is configured for reading a first sensor data from the high pressure sensor, a second sensor data from the low pressure sensor and vehicle data from an engine control unit (ECU) coupled to an engine, calculating a desired position of the pintle within the orifice based on the first sensor data, the second sensor data and the vehicle data, and transmitting a signal to the motor for moving the pintle to the desired position within the orifice.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

In accordance with the embodiments described herein, a pressure-reducing regulator for CNG fuel is disclosed that overcomes the problems with the prior art as discussed above, by providing an efficient high pressure regulator that provides a constant fuel pressure and flow at desirable levels, and takes various relevant factors into account when performing regulator functions. By using a pintle and bore design, wherein the pintle is moved by a motor that is controlled by a processor taking a multitude of data into account, including data from an engine control unit, the pressure-reducing regulator of the present invention solves the commonly-known "droop" problem among regulators that produces a time delay in meeting increased fuel need. The above-noted feature of the present invention reduces or eliminates the aforementioned time delay, thereby providing an immediate, or near immediate, response to a pedal command. By addressing the "droop" phenomenon, the above-noted feature further improves emissions of an internal combustion engine. Additionally, by taking into account the plethora of conditions and data that surround an internal combustion engine when performing regulator functions, the regulator of the present invention provides more precise and optimized regulation of fuel flow to the engine, resulting in fuel savings and higher-quality emissions.

Figure 1:
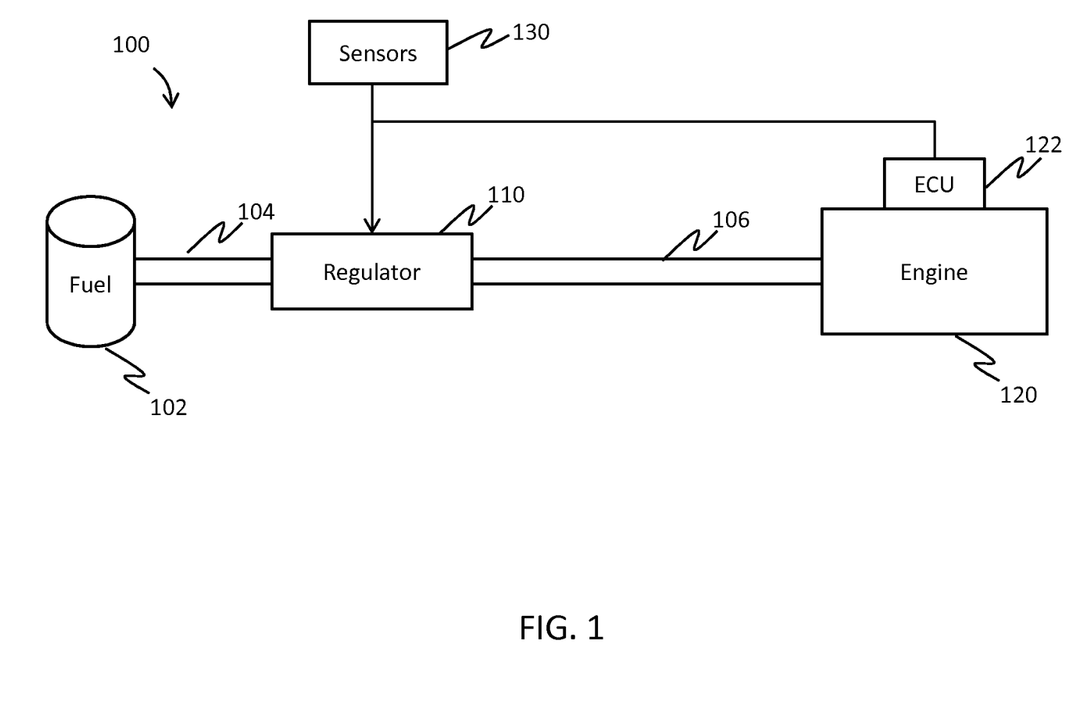
FIG. 1 is a block diagram showing a system that depicts generally the placement of the high pressure regulator, in accordance with one embodiment.

FIG. 1 is a block diagram showing a system 100 that depicts generally the placement of the high pressure regulator 110, in accordance with one embodiment. The system 100 may be implemented in any arrangement that requires an internal combustion engine, such as in a motor vehicle implementation. FIG. 1 shows that the system 100 includes a fuel supply 102, which may be storage tank for storing CNG at a high pressure, such as 3600 psi, and an internal combustion engine 120 that consumes the fuel in the fuel supply. The engine 120 is coupled with an engine control unit (ECU) 122, also called a powertrain control module, which is an electronic control unit that controls one or more actuators associated with the engine 120 in order to ensure optimal operation. The ECU 122, which is well known in the art, reads data from one or more sensors, interprets the data, and adjusts the actuators accordingly.

A fuel conduit 104 is used to transfer the fuel from fuel supply 102 to the high pressure regulator 110 of the present invention. The regulator 110 performs pressure regulating functions, including reducing the initially high pressure of the incoming fuel from the fuel supply 102 to a lower pressure that is more easily used by the engine 120, such as 100-150 psi. The regulator 110 also performs other functions, described in more detail below, which includes reading data from sensors 130 and from ECU 122. The regulator 110 may operate via power, such as 12-volts, supplied by the host vehicle. A fuel conduit 106 is used to transfer the fuel from the regulator 110 to the engine 120, which proceeds to consume the fuel.

In one embodiment, the sensors 130 include a mass flow sensor that senses and reports the mass flow rate of the fuel that has exited the regulator 110. Gas changes its density as it expands and contracts with temperature and pressure. The data provided by a mass flow sensor may be used by the system 100 to balance and deliver the correct fuel mass to the engine 120. In another embodiment, the sensors 130 include a gas composition sensor that senses and reports the pure substances that comprise the fuel that has exited the regulator 110. The gas composition sensor may also state for each substance its proportion of the gas mixture's molecule count. In one example, the gas composition sensor can measure the methane value of the fuel, which is a relevant data value because the ability of fuel to power the engine 120 is based on the methane value of the fuel. Methane value of fuel is further relevant because methane value of fuel may vary according to location. Thus, methane value of fuel may be used to calibrate usage of the fuel so as to ensure consistent performance of the system 100, regardless of the composition of the fuel.

Figure 2:
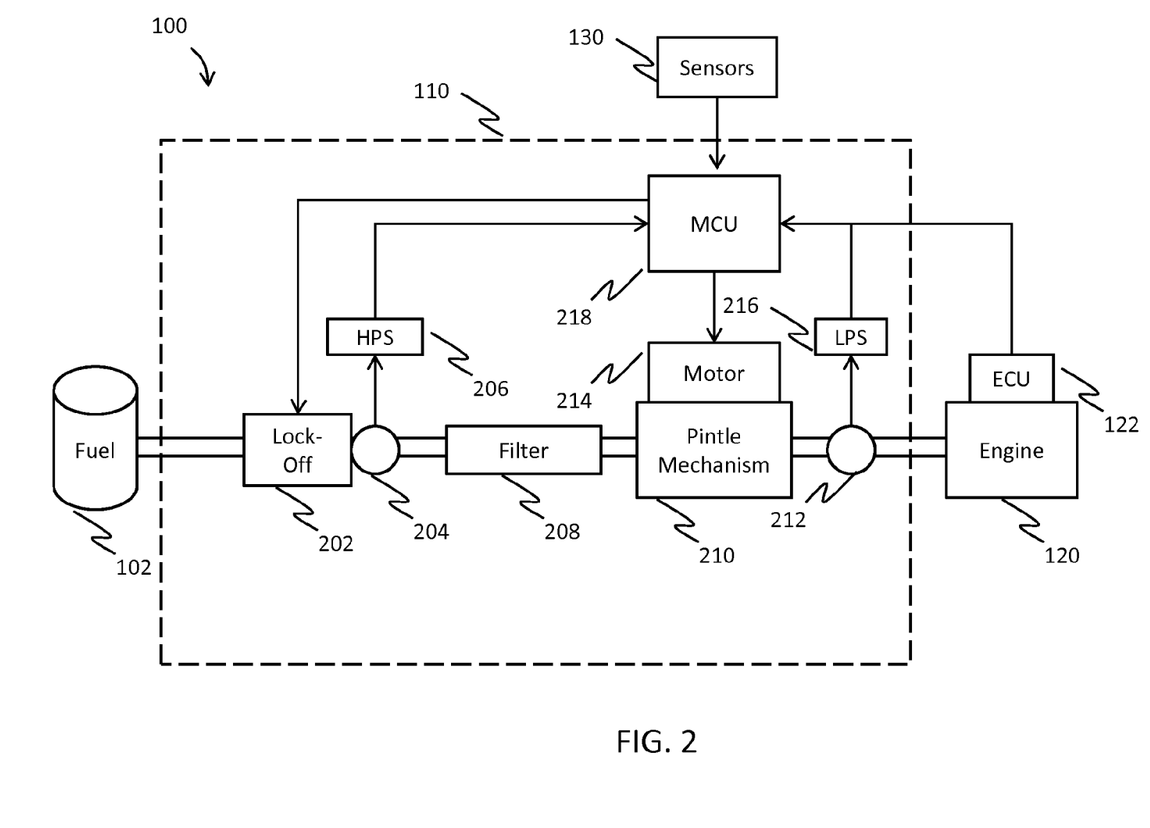
FIG. 2 is a block diagram showing the system, including a more detailed illustration of the components of the high pressure regulator, in accordance with one embodiment.

FIG. 2 is a block diagram showing the system 100, including a more detailed illustration of the components of the high pressure regulator 110, in accordance with one embodiment. FIG. 2 shows that regulator 110 includes an inlet 204 for ingress of fuel from the fuel supply 102 and outlet 212 for egress of fuel out of the regulator 110. Prior to entry into the regulator 110, fuel from the fuel supply 102 passes through a lock-off valve 202. The lock-off valve 202 is a safety valve that remains open and allows fuel to pass through it as long as the lock-off valve 202 is receiving a voltage. When the lock-off valve 202 no longer receives a voltage, the valve closes and does not allow fuel to pass through it. The lock-off valve 202 may be implemented using a 12-volt solenoid that opens a valve when activated with a 12-volt current, but that closes a valve when no voltage is present. The lock-off valve 202 is controlled by the micro control unit (MCU) 218 and may be communicatively coupled with the MCU 218 via a communications bus, as described more fully below.

FIG. 2 further shows a filter element 208 that filters the fuel from inlet 204 so as to remove unwanted items from the fuel. The filter element 208 may comprise a coalescing filter element that removes water, oil, hydrocarbon materials or other undesirable substances from the fuel. In one embodiment, the filter element 208 may comprise a paper element comprising epoxy saturated borosilicate glass micro-fiber material. Subsequent to passing through the filter element 208, fuel passes through a pressure reduction process wherein fuel passes through an orifice into a pressure reduction chamber that reduces the pressure of the fuel, wherein access to the pressure reduction chamber is controlled by a pintle mechanism 210.

Figure 3:
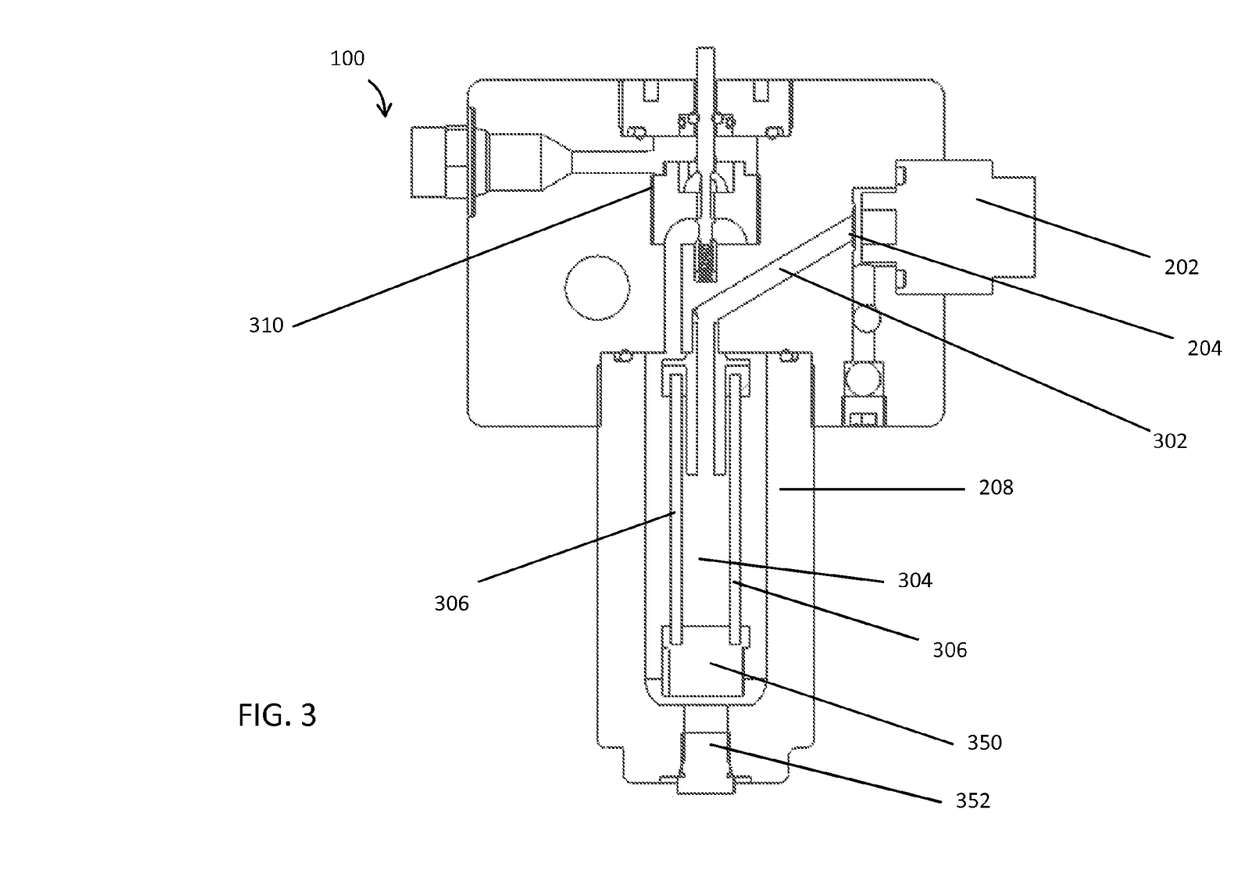
FIG. 3 is an illustration of a cross sectional view of the high pressure regulator, in accordance with one embodiment.

The pintle mechanism 210 comprises a pintle, consisting of a shaft-like element, which is positioned within a bore that provides access to a pressure reduction chamber (see FIG. 3). The opening, or orifice, of the bore allows high pressure fuel, which has passed through the filter element 208, to enter a pressure reduction chamber. The pintle, as explained more fully below with reference to FIG. 3, includes a collar that closes access to the orifice when the pintle is moved such that the collar is adjacent to the orifice. This prevents fuel from entering the pressure reduction chamber. When the pintle is moved such that the collar is moved away from the orifice, access to the orifice is opened, thereby allowing fuel to enter the pressure reduction chamber. Note that the flow rate of fuel through the orifice varies according to a position of the pintle within the orifice.

FIG. 2 also shows a motor 214, which controls the position of the pintle in the pintle mechanism 210. The motor 214 may comprise a brushless, direct current, electric motor, such as a stepper motor, that divides a full rotation into a number of equal steps. In another alternative, the motor 214 may be a linear actuator motor. The motor 214 may be commanded to move and hold at one of the steps. The motor 214 is controlled by the MCU 218 and may be communicatively coupled with the MCU 218 via a communications bus. At any given moment, the MCU 218 may store a data value representing a current step of the motor 214, and therefore the current position of the pintle in the pintle mechanism 210. Alternatively, the MCU 218 may, at any moment, read a data value from the motor 214, which represents a current step of the motor 214.

Also shown in FIG. 2 is a high pressure sensor 206, which measures and reports the pressure of the fuel at the inlet 204, and a low pressure sensor 216, which measures and reports the pressure of the fuel at the outlet 212. The low and high pressure sensors 206, 216 report to the MCU 218 and may be communicatively coupled with the MCU 218 via a communications bus.

Lastly, FIG. 2 shows the MCU 218, comprising a processing unit or microprocessor that reads data from various sources, calculates the appropriate position of the pintle in the pintle mechanism 210 and commands the motor 214 to move the pintle to the appropriate position within the pintle mechanism 210. The MCU 218 reads data from the high pressure sensor 206, the low pressure sensor 216, the sensors 130 and the ECU 122, which data is used when calculating the appropriate position of the pintle in the pintle mechanism 210, as explained in more detail with respect to FIG. 8 below. The data read from sensors 130 (which may include a mass flow sensor) may comprise a numerical value that represents an amount of CNG weight per unit time (such as pounds per hour) that flows past the sensor. The data read from sensors 130 (which may also include a gas composition sensor) may further comprise a percentage data value representing a percentage of methane gas detected in the fuel.

The ECU 122 may provide a variety of data to the MCU 218, such as throttle position sensor data, engine RPM data, accelerator pedal position sensor data, injection pulse width modulation data, manifold absolute pressure data, and engine coolant temperature data. The ECU 122 may also provide other data to the MCU 218, such as vehicle speed data, clutch switch data, brake switch data, cruise control data, power takeoff status data, total fuel used data, fuel level data, engine speed data, axle weight data, total engine hours data, service distance data, etc. The ECU 122 may also provide deltas of the aforementioned values, i.e., the amount or percentage the aforementioned data values have changes since the last sensor reading. For example, with regard to accelerator pedal position sensor data the ECU 122 may provide a data value of 15%, which corresponds to an accelerator pedal position that has changed 15% in the positive direction since the last sensor reading.

In one embodiment, the ECU 122 and the MCU 218 are communicatively coupled via a communications bus, such as the SAE J1939 vehicle bus standard used for communication and diagnostics among vehicle components. Any of the data provided by ECU 122 to MCU 218 may be referred to as vehicle data. Further, any of the data read by MCU 218 from the high and low pressure sensors 206, 216, sensors 130 or ECU 122 may be in numerical format, alphanumeric format or the like.

FIG. 3 is an illustration of a cross sectional view of the high pressure regulator 110, in accordance with one embodiment. FIG. 3 shows that incoming fuel from the fuel supply 102 pass through the lock-off 202 and inlet 204 of the regulator 110. Subsequently, the fuel travels via conduit 302 into a main filter chamber 304, which may be a cylindrical shape, of the filter element 208. The main filter chamber 304 may include a reservoir 350 beneath the filter element, wherein the reservoir collects liquid elements that have been separated by the filter. A plug 352 at the bottom of the regulator 110 provides access to the reservoir and allows a user o drain any liquid elements that have been collected in the reservoir. Next, the fuel is filtered through a filter surface 306, which may be a paper element comprising epoxy saturated borosilicate glass micro-fiber material. Subsequent to passing through the filter element 208, fuel passes through the pressure reduction components 310 of the regulator 110, explained in greater detail below.

Figure 4:
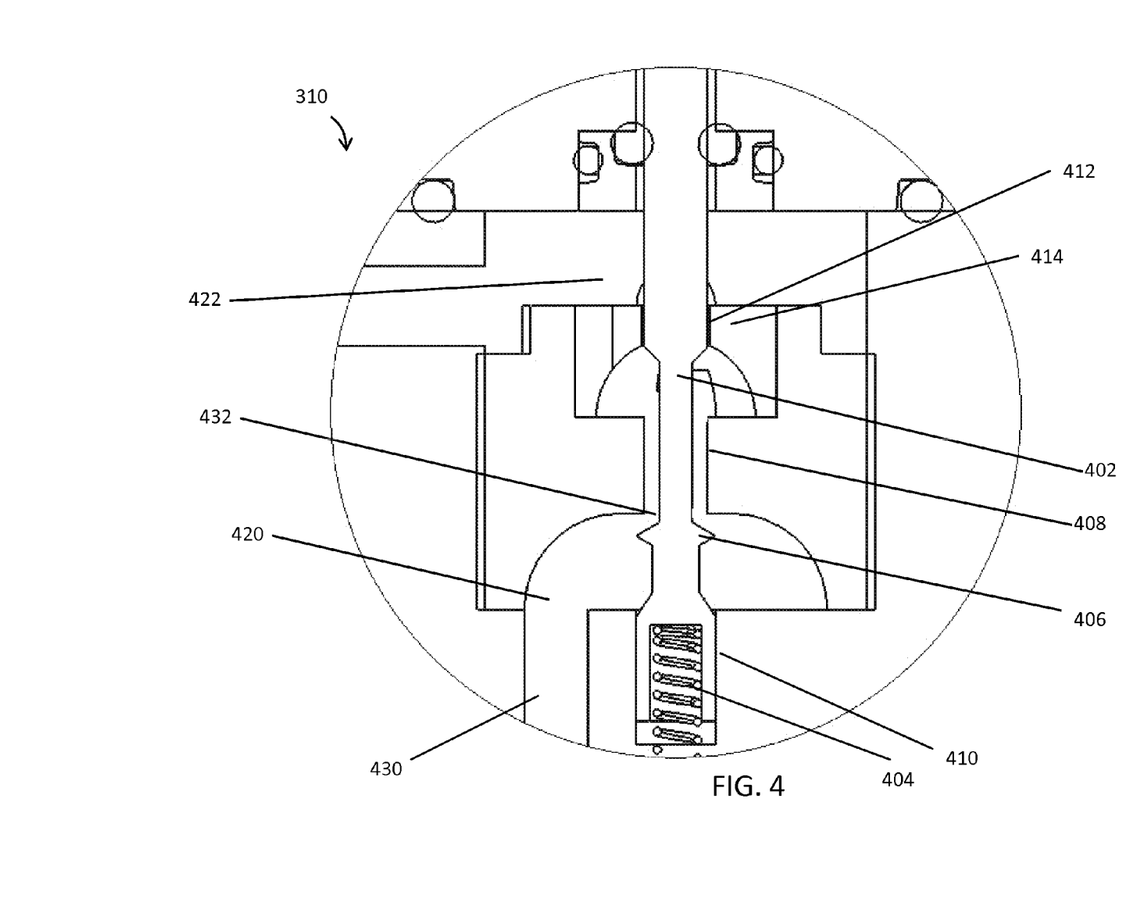
FIG. 4 is an illustration of a cross sectional view of the pressure reduction components of the high pressure regulator, shown in an open position, in accordance with one embodiment.

FIG. 4 is an illustration of a cross sectional view of the pressure reduction components 310 of the high pressure regulator 110, shown in an open position, in accordance with one embodiment. The pressure reduction area 310 comprises the pintle 402, a spring 404, a collar 406, a first bore 408, a second bore 410, a third bore 412 and a stopper 414. The pressure reduction area 310 further comprises a high pressure chamber 420 and a pressure reduction chamber 422. FIG. 4 shows fuel that has passed through the filter element 208 subsequently enters a conduit 430 that leads to the high pressure chamber 420 wherein the fuel retains substantially the same high pressure as the fuel exhibited upon entry at inlet 204. The high pressure chamber 420 provides access to an orifice 432 that leads to the first bore 408, which provides access to the pressure reduction chamber 422. Upon entry into the pressure reduction chamber 422, the gas fuel expands, thereby lowering its pressure.

A section of the main core of the regulator 110 includes a second bore 410 having a diameter substantially equal to the outer diameter of the portion of the pintle 402 that is inserted into the second bore 410. The purpose of the second bore 410 is to provide a linear guide for the pintle 402 to move upwards and downwards along the main longitudinal axis of the bore 410. A spring 404 is located underneath and/or within the portion of the pintle 402 that is inserted into the second bore 410. The spring 404 is arranged such that it constantly produces an upward force against the pintle 402, thereby pushing the pintle 402 in an upwards direction.

Another section of the main core of the regulator 110 includes the first bore 408 having a diameter substantially greater than the outer diameter of the portion of the pintle 402 that is inserted into the first bore 408. The purpose of the first bore 408 is to allow gas fuel to pass from the high pressure chamber 420 to the pressure reduction chamber 422. The collar 406 has a diameter substantially greater than the inner diameter of the first bore 408, such that when the pintle 402 is moved upwards, the collar 406 may rest against the outer brim of the orifice 432 that leads to the first bore 408, thereby plugging the orifice 432 and preventing any gas fuel from entering the orifice 432. As the pintle 402 is subsequently moved downwards, the collar 406 pulls away from the orifice 432, thereby providing access to the orifice 432 and allowing gas fuel to enter the orifice 432. The greater the distance between the collar 406 and the orifice 432, the greater the amount of space for gas fuel to enter the orifice 432. In this manner, the flow rate of gas fuel through the orifice 432 varies according to the position of the pintle 402 within the bore 408.

The stopper 414, which is secured to the pressure reduction chamber 422 and does not move, includes the third bore 412 having a diameter substantially equal to the outer diameter of the portion of the pintle 402 that is inserted into the third bore 412. Note that stopper 414 comprises substantially a toroidal shape that, when viewed from a side cross sectional view, shows a semicircular cutout along its bottom. When viewed from above, the stopper 414 also includes substantially sector-shaped cutouts (for example, three or more) from the toroidal shape of the stopper 414 (see FIG. 9). The various cutouts of the stopper 414, therefore, define a volume that is contiguous with the volume of the pressure reduction chamber 422. The first purpose of the stopper 414 is to provide the third bore 412, which acts as a linear guide for the pintle 402 to move upwards and downwards along the main longitudinal axis of the bore 412. The second purpose of the stopper 412 is to allow gas fuel to pass through it and on to the remaining portions of the pressure reduction chamber 422. Note that the first, second and third bores 408, 410, 412 are concentric and have the same longitudinal axis.

In one embodiment, the regulator 110 includes a pressure relief valve in the pressure reduction chamber 422, which acts as a safety device to release pressure if there is a malfunction that results in an unexpected increase in pressure in the pressure reduction chamber 422. After passing through the pressure reduction chamber 422, the gas fuel travels out of the outlet 212 of the high pressure regulator 110 and to the engine 120.

Figure 5:
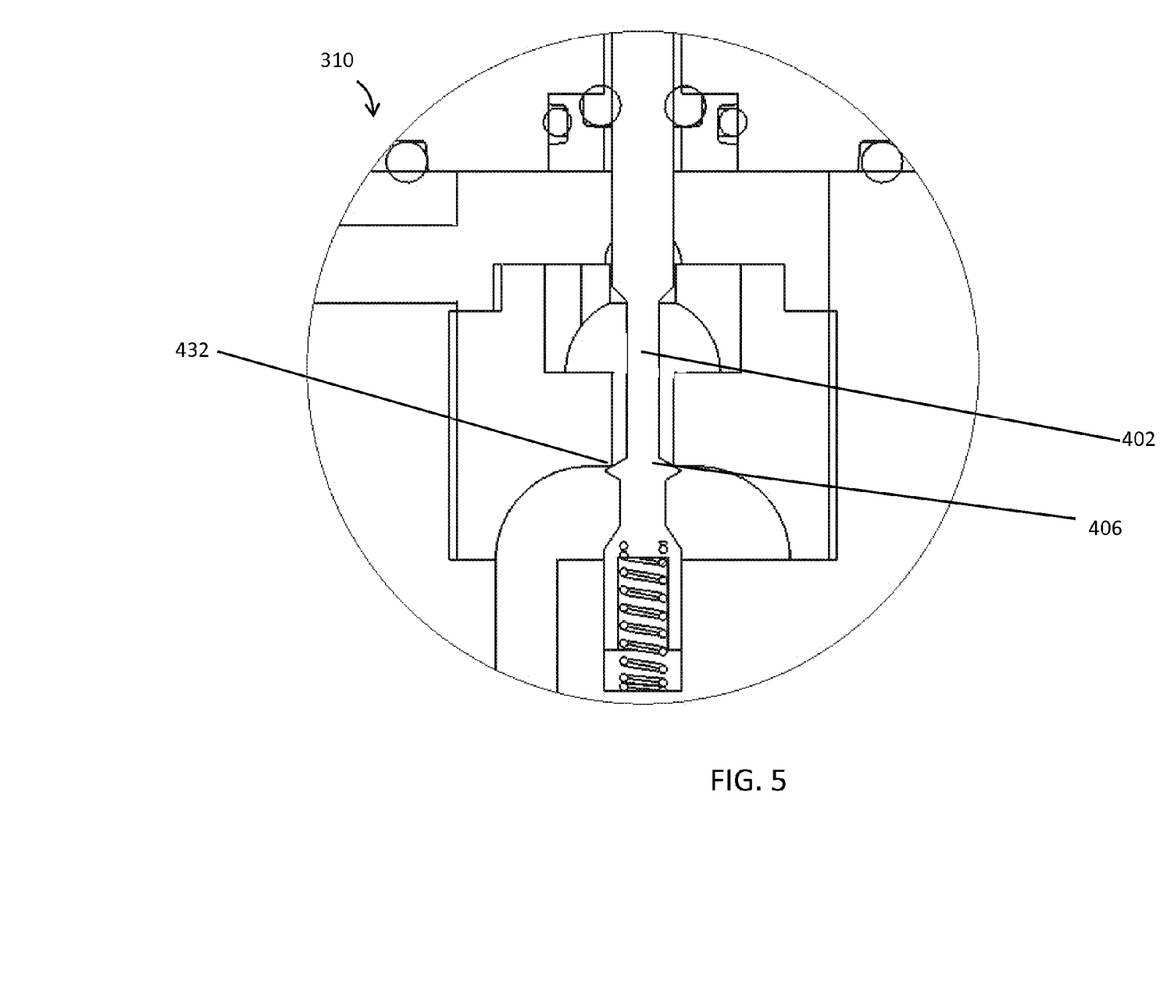
FIG. 5 is an illustration of a cross sectional view of the pressure reduction components of the high pressure regulator, shown in a closed position, in accordance with one embodiment.

FIG. 5 is an illustration of a cross sectional view of the pressure reduction components 310 of the high pressure regulator 110, shown in a closed position, in accordance with one embodiment. FIG. 5 shows that the pintle 402 has been moved upwards, and the collar 406 rests against the outer brim of the orifice 432 that leads to the first bore 408, thereby plugging the orifice 432 and preventing any gas fuel from entering the orifice 432. In this closed position, gas fuel cannot pass through the regulator 110 and on to the engine 120.

Figure 9:
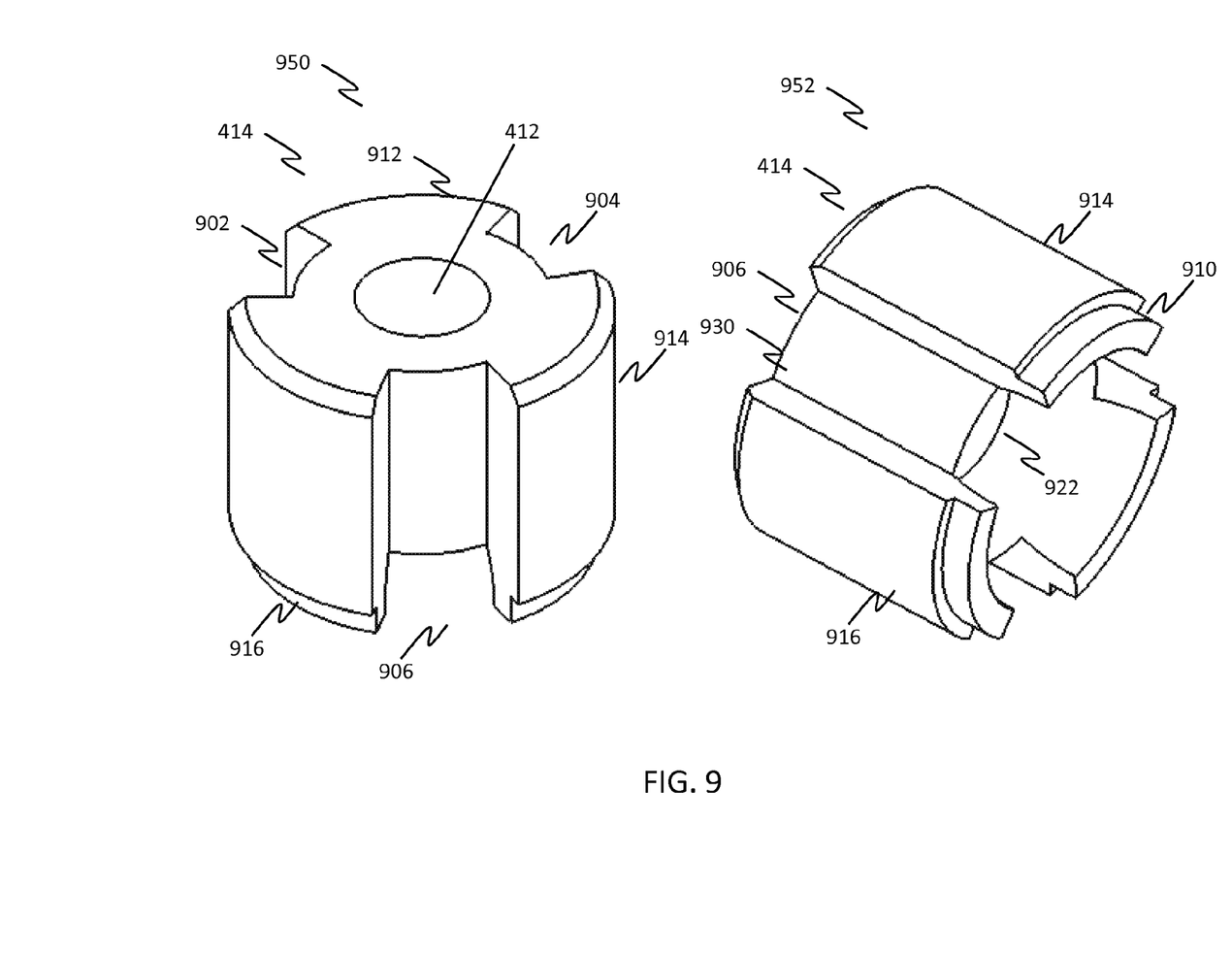
FIG. 9 is an illustration of two views of the stopper, in accordance with one embodiment.

FIG. 9 is an illustration of two views of the stopper 414, in accordance with one embodiment. The first view 950 of the stopper 414 shows a top perspective view of the element. The view 950 shows that the stopper 414 comprises substantially a cylindrical shape having a bore 412 extending longitudinally through the cylindrical shape of stopper 414, and including substantially sector-shaped cutouts 902, 904 and 906 that also extend longitudinally through the cylindrical shape of stopper 414. The cutouts therefore create at least three protruding sidewalls 916, 912 and 914 wherein the radius of the outside surface of the stopper 414 at the protruding sidewalls 916, 912 and 914 is larger than the radius of the outside surface of the stopper 414 at the cutouts 902, 904 and 906. Note that bore 412 has a diameter substantially equal to the outer diameter of the portion of the pintle 402 that is inserted into the bore 412.

The second view 952 of the stopper 414 shows a side perspective view of the stopper 414. The view 952 shows that the protruding sidewalls 916, 912 and 914 end in a reduced edge 910, wherein the radius of the outside surface of the stopper 414 at the reduce edge 910 is smaller than the radius of the outside surface of the stopper 414 at the protruding sidewalls 916, 912 and 914. View 952 also shows that sidewall 930 of the stopper 414 at the cutout 906 does not extend as far as the reduced edge 910. This produces a gap 922 between the protruding sidewalls 916 and 916. When the stopper 414 is installed in the high pressure regulator 110 (as shown in FIG. 3 and FIG. 4), the various cutouts 902-906 and the gap 922 of the stopper 414, therefore, allows gas fuel to pass from underneath the stopper 414 (i.e., the high pressure chamber 420) and into the pressure reduction chamber 422 (see FIG. 4).

Figure 6:
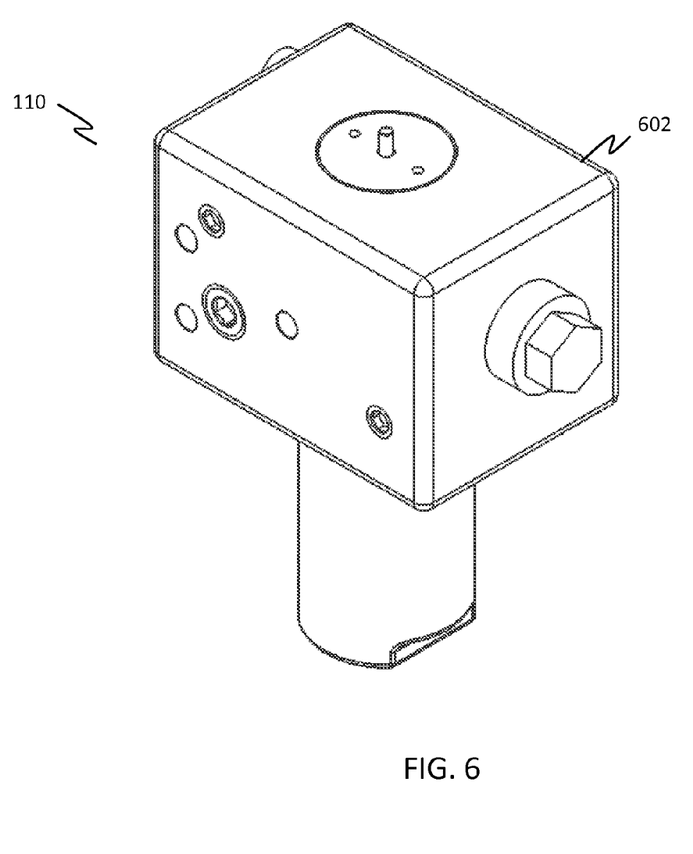
FIG. 6 is an illustration of a frontal perspective view of the high pressure regulator, in accordance with one embodiment.

FIG. 6 is an illustration of a frontal perspective view of the high pressure regulator 110, in accordance with one embodiment. FIG. 6 shows a housing 602 that may be composed of aluminum. The housing 602 may include a variety of fitting and mounting holes, as well as access to the inlet 204 and outlet 212. The fitting and mounting holes may be used to insert and/or secure various sensors, such as the high pressure and low pressure sensors, 206, 216, as well as the lock off valve 202. The mounting holes may be used to mount the regulator 110 to the fuel supply 102, the conduits 104, 106, the engine 120 and/or the vehicle. Various portions of the regulator 110, such as the main core of the regulator 110, described with reference to FIG. 4 above, may be composed of stainless steel. In one embodiment, the regulator 110 includes a coolant passage or bore, through which a coolant substance is inserted, so as to prevent freezing of the regulator 110 due to the Joules Thompson effect. FIG. 6 shows at least one orifice that defines an entrance and/or exit for the coolant passage.

Figure 7:
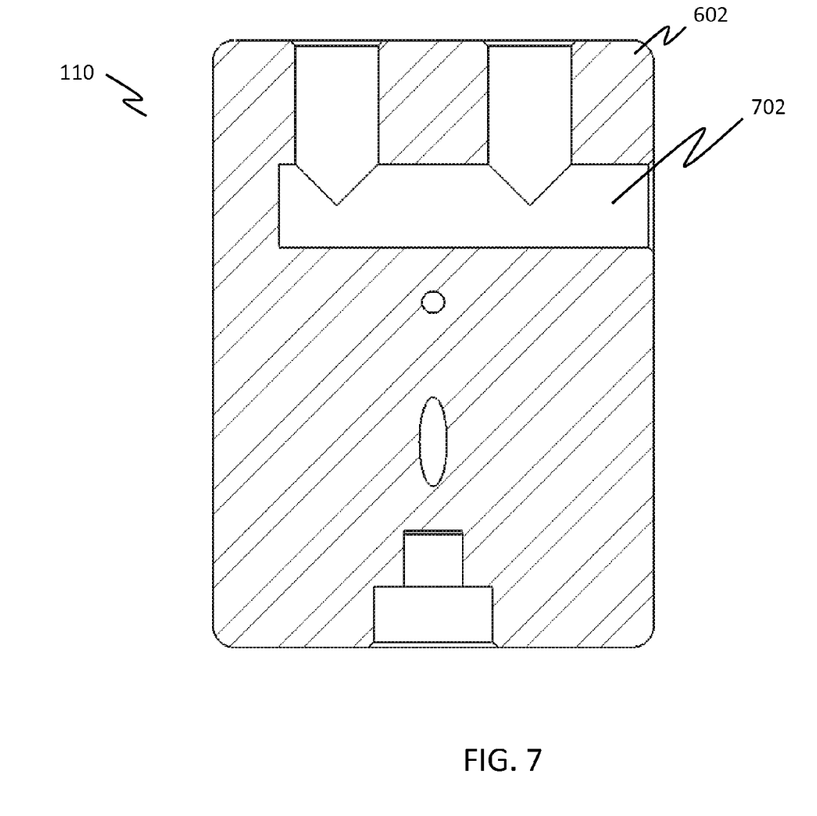
FIG. 7 is an illustration of a cross-sectional view of the high pressure regulator showing the coolant passage, in accordance with one embodiment.

FIG. 7 is an illustration of a cross-sectional view of the high pressure regulator 110 showing the coolant passage 702, in accordance with one embodiment. FIG. 7 shows the housing 602 that may be composed of aluminum. FIG. 7 also shows that the regulator 110 includes a coolant passage 702 or bore, through which a coolant substance, such as anti-freeze may flow. FIG. 7 further shows that the regulator 110 includes inlet and outlet ports for the coolant to travel through the regulator, so as to prevent freezing of the regulator 110 due to the Joules Thompson effect.

Figure 8:
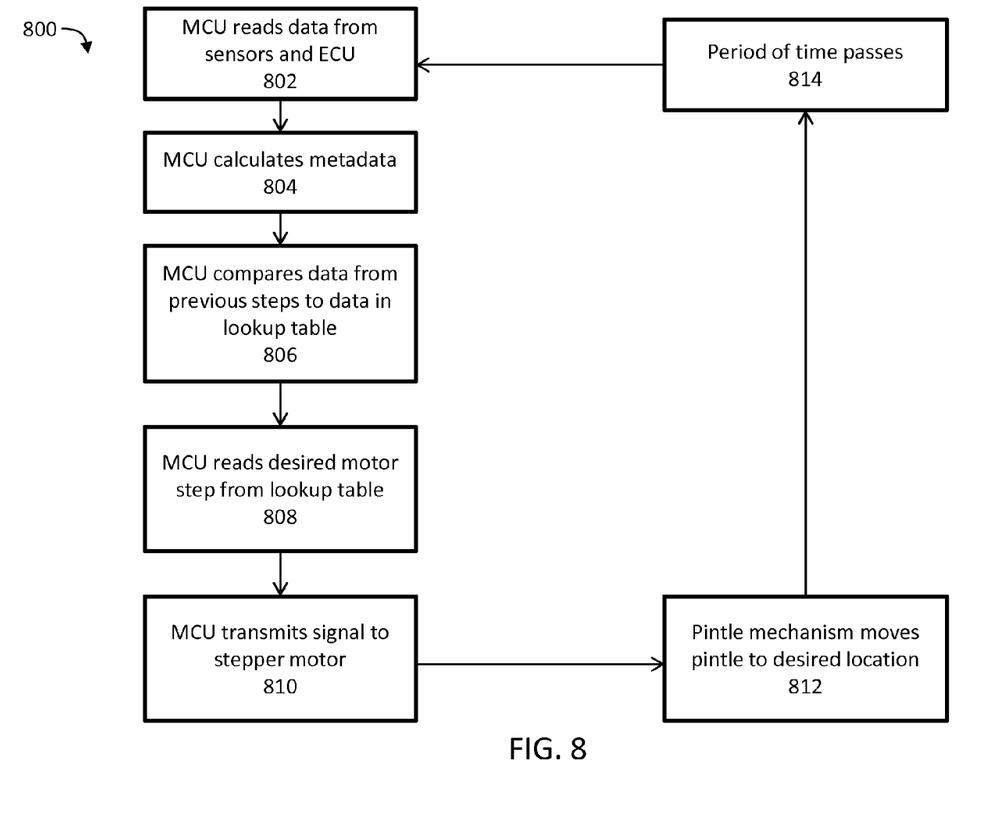
FIG. 8 is a flowchart describing a method for moving the pintle mechanism, in one embodiment of the present invention.

FIG. 8 is a flowchart describing the method 800 for moving the pintle mechanism 210, in one embodiment of the present invention. Specifically, the method 800 describes how MCU 218 reads data from various sources, calculates the appropriate position of the pintle 402 in the pintle mechanism 210 and commands the motor 214 to move the pintle 402 to the appropriate position within the pintle mechanism 210. In a first step 802, the MCU 218 reads data in real time, or near real time, from the high pressure sensor 206, the low pressure sensor 216, and the sensors 130. Also in step 802, the MCU 218 reads vehicle data from the ECU 122, which is defined in greater detail above. Additionally in step 802, the MCU 218 reads a current step of the motor 214, which corresponds to the current position of the pintle 402 in the pintle mechanism 210.

In optional step 804, the MCU 218 may calculate metadata based on the data read in step 802. For example, the MCU 218 may calculate the difference between a data value read from the high pressure sensor 206 and a data value read from the low pressure sensor 216, resulting in a delta value that represents the difference between the two data values.

In step 806, the MCU 218 compares a subset of the data read in step 802 and the data generated in step 804 to data in a stored lookup table. The lookup table may comprise a data structure comprising a list or chart wherein each line or row lists data values or ranges of data values for sensor data. The data values or ranges of data values in the lookup table correspond to the data read in step 802 and the data generated in step 804. In one example, the lookup table comprises a chart wherein each row lists a data value from the high pressure sensor 206, a data value from the low pressure sensor 216 and a range of values for the mass flow sensor (130). If the data read in step 802 from the high and low pressure sensors 206, 216 and the mass flow sensor match the data values in a particular row of the lookup table, then there is a match. Therefore, in step 806, the MCU 218 compares data from steps 802, 804 to data in the lookup table with the purpose of identifying a line or row in the lookup table that matches the data from steps 802, 804.

In one embodiment of the present invention, each line or row of the lookup table also includes a desired step of the motor 214 that corresponds to the data values, or ranges, in that line or row. That is, the lookup table lists the step at which the motor 214 should be positioned, in order to provide optimal fuel efficiency, reaction time and emissions, for certain data values or ranges of data values for sensor data. Therefore, each line or row of the lookup table may be seen as an if-then statement wherein the if-portion of the statement corresponds to data values or ranges of data values for sensor data and the then-portion of the statement corresponds to a desired step of the motor 214. In one embodiment, the stored lookup table may be stored in volatile memory, such as RAM, or non-volatile memory, such as ROM, EPROM or flash memory.

In step 808, the MCU 218 reads the desired step of the motor 214 corresponding to the matching line or row of the lookup table, which was identified in step 806. In step 810, the MCU 218 transmits a signal to the motor 214 to move to the desired step. In step 812, responsive to the signal received in step 810, the motor 214 moves the pintle 402 to the optimal position in the pintle mechanism 210. In step 814, a set period of time passes. In one embodiment, step 814 includes the passing of 700 milliseconds. Subsequently, control flows immediately back to step 802 wherein steps 802 through 812 are executed periodically.

Note that in a conventional diaphragm and spring-design regulator, the diaphragm and spring components react solely to the amount of pressure the components experience. This creates a delay between the moment there is a pressure change, such as in response to a gas pedal push, and the moment the diaphragm and spring react to the pressure change. Thus, when there is an increased need for fuel (such as in response to a gas pedal push), the diaphragm and spring design exhibits a time delay in meeting the increased fuel need. The present invention solves this problem by monitoring data from various sources in real time, or near real time, and immediately calibrating the flow rate of gas fuel to the engine 120 by issuing commands to the motor 214 that moves the pintle mechanism 210, which controls the flow rate of fuel. This results in a faster reaction time to current conditions, as opposed to conventional diaphragm and spring regulators, which exhibit slower reaction times.

Note that the cyclical process of method 400 involves the MCU 218 using feedback data from the ECU 122, as well as other sensors, to confirm the appropriate position of the pintle 402 in the pintle mechanism 210. By reading data from the ECU 122 and the other sensors, the MCU 218 can verify, for example, that the correct flow rate of gas fuel has been provided to the engine 120. If the data from the ECU 122 and the sensors shows that optimal flow rate of gas fuel has not been provided, the MCU 218 may make appropriate corrections to the position of the pintle 402 in the pintle mechanism 210. This feedback loop is performed periodically, such as every 700 milliseconds, so as to ensure optimal gas fuel flow rate and provide quick reactions to changing conditions.

In another embodiment, the MCU 218 may perform predefined diagnostic algorithms and transmit results of the diagnostic algorithms to the ECU 122, such that the ECU 122 may make necessary adjustments or display data. For example, based on data received from the high pressure sensor 206, the MCU 218 may send a signal to the ECU 122 reporting high pressure sensor data, and in response the ECU 122 may display fuel level indication data in the dashboard of the vehicle for the driver. In another example, based on data received from the fuel composition sensor 130, the MCU 218 may send a signal to the ECU 122 reporting the fuel composition data, and in response the ECU 122 may display a visual light that indicates the methane component of the fuel is too low. In yet another example, based on data received from the low pressure sensor 216 and the fuel composition sensor 130, the MCU 218 may send a signal to the ECU 122 reporting the low pressure data and the fuel composition data, and in response the ECU 122 may change the injection pulse width modulation of the engine 120.

In another example, the MCU 218 may monitor the high and low pressure delta on the regulator 110 (i.e., the difference between the high pressure sensor 206 data and the low pressure sensor 216 data) so as to diagnose pressure and flow fluctuations which may be a result of clogging of the filter element 208 over time. The MCU 218 may also detect whether the lock off valve 202 is functioning properly by reading sensor data from the lock-of valve 202. The MCU 218 may also detect whether there are downstream low-pressure restrictions by reading data from the sensors 130 and/or the low pressure sensor 216. In summary, the MCU 218 may perform diagnostic operations on any data garnered from the system 100, including high pressure sensor 206 data, low pressure sensor 216 data, high and low pressure delta on the regulator 110, mass flow sensor 130 data, fuel composition sensor 130 data, lock-off valve 202 data, motor 214 data, ECU 122 data, etc. Any diagnostic data generated by the MCU 218 may be transmitted to the ECU 122 and may be incorporated into a Malfunction Indicator Light (MIL) on the host vehicle.

While certain embodiments of the invention have been described, other embodiments may exist. Furthermore, although embodiments of the present invention have been described as being associated with CNG, the present invention also supports other types of gas fuel and fluid fuel. Although the subject matter has been described in language specific to structural features, it is to be understood that the subject matter defined in the appended claims is not necessarily limited to the specific features or acts described above. Rather, the specific features and acts described above are disclosed as example forms of implementing the claims.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A pressure-reducing regulator for compressed natural gas (CNG) fuel, comprising:
   a high pressure sensor that detects fuel pressure at an inlet for ingress of fuel into the regulator;
   a filter element that filters fuel from the inlet;
   an orifice for accepting ingress of fuel from the filter element, wherein the orifice provides access to a pressure reduction chamber;
   a movable pintle located within the orifice, such that a flow rate of fuel through the orifice varies according to a position of the pintle within the orifice;
   a motor that moves the pintle within the orifice;
   a low pressure sensor that detects fuel pressure at an outlet for egress of fuel out of the regulator; and
   a control unit comprising a processing unit configured for:
      reading a first sensor data from the high pressure sensor, a second sensor data from the low pressure sensor and vehicle data from an engine control unit (ECU) coupled to an engine;
      calculating a desired position of the pintle within the orifice based on the first sensor data, the second sensor data and the vehicle data;
      transmitting a signal to the motor for moving the pintle to the desired position within the orifice.

2. The regulator of claim 1, further comprising an aluminum housing for encasing the high and low pressure sensors, the filter element, the orifice, the pressure reduction chamber, the pintle, the motor and the control unit, wherein the inlet and the outlet comprise bores located in the aluminum housing.

3. The regulator of claim 2, further comprising a coolant passage located within the aluminum housing.

4. The regulator of claim 3, further comprising a fuel shutoff valve coupled with the inlet, wherein the fuel shutoff valve closes access to the inlet if power to the fuel shutoff valve ceases.

5. The regulator of claim 4, further comprising a reservoir located at the bottom of the filter element for collecting byproducts.

6. The regulator of claim 1, wherein the step of calculating a desired position by the control unit further comprises comparing the first sensor data, the second sensor data and the vehicle data to a stored list of values.

7. The regulator of claim 6, wherein the control unit is further configured for transmitting the first sensor data from the high pressure sensor to the ECU via a controller area network (CAN) bus.

8. The regulator of claim 7, wherein the control unit is further configured for performing predefined diagnostic algorithms and transmitting results of the diagnostic algorithms to the ECU via the CAN bus.

9. The regulator of claim 8, wherein the control unit is further configured for reading a third sensor data from a mass flow sensor configured to collect data from fuel after egress from the regulator, and a fourth sensor data from a fuel composition sensor configured to collect data from fuel after egress from the regulator.

10. The regulator of claim 9, wherein the step of calculating a desired position of the pintle within the orifice is further based on the third sensor data and the fourth sensor data.

11. The regulator of claim 9, wherein the vehicle data from the ECU further comprises one or more of: throttle position sensor data, engine revolutions per minute data, accelerator pedal position sensor data, injection pulse width modulation, manifold absolute pressure and engine coolant temperature.

12. The regulator of claim 1, wherein the pintle further comprises a collar that closes access to the orifice when the pintle is moved such that the collar is adjacent to the orifice.

13. The regulator of claim 12, wherein the motor further comprises an electric stepper motor or a linear actuator motor.

14. The regulator of claim 13, further comprising a spring located underneath the pintle, wherein the spring places a force on the pintle in the direction of the orifice.

15. The regulator of claim 13, wherein the filter element further comprises a paper element consisting of epoxy saturated with borosilicate glass micro-fiber material that filters fuel from the inlet.

16. A pressure-reducing regulator for compressed natural gas (CNG) fuel, comprising a metallic housing that encases:
   a high pressure sensor that detects fuel pressure at an inlet for ingress of fuel into the regulator;
   a coalescing filter element that filters fuel from the inlet;
   an orifice for accepting ingress of fuel from the filter element, wherein the orifice provides access to a pressure reduction chamber;
   a movable pintle located within the orifice, such that a flow rate of fuel through the orifice varies according to a position of the pintle within the orifice;
   a motor that moves the pintle within the orifice;
   a low pressure sensor that detects fuel pressure at an outlet for egress of fuel out of the regulator;
   a mass flow sensor configured to collect flow data from fuel after egress from the regulator;
   a fuel composition sensor configured to collect fuel composition data from fuel after egress from the regulator; and
   a control unit comprising a processing unit configured for:
      reading a first sensor data from the high pressure sensor, a second sensor data from the low pressure sensor, a third sensor data from the mass flow sensor, a fourth sensor data from the fuel composition sensor and vehicle data from an engine control unit (ECU) coupled to an engine;
      calculating a desired position of the pintle within the orifice based on the first sensor data, the second sensor data, the third sensor data, the fourth sensor data, the vehicle data and a stored list of sensor data; and
      transmitting a signal to the motor for moving the pintle to the desired position within the orifice.

17. The regulator of claim 16, wherein the vehicle data from the ECU further comprises one or more of: throttle position sensor data, engine revolutions per minute data, accelerator pedal position sensor data, injection pulse width modulation, manifold absolute pressure and engine coolant temperature.

18. A pressure-reducing regulator for compressed natural gas (CNG) fuel, comprising:
   a high pressure sensor that detects fuel pressure at an inlet for ingress of fuel into the regulator;
   a coalescing filter element that filters fuel from the inlet;
   an orifice for accepting ingress of fuel from the filter element, wherein the orifice provides access to a pressure reduction chamber;
   a movable pintle located within the orifice, such that a flow rate of fuel through the orifice varies according to a position of the pintle within the orifice;
   a motor that moves the pintle within the orifice;

a low pressure sensor that detects fuel pressure at an outlet for egress of fuel out of the regulator; and a control unit comprising a processing unit configured for:
reading a first sensor data from the high pressure sensor, a second sensor data from the low pressure sensor, and vehicle data from an engine control unit (ECU) coupled to an engine;

calculating a desired position of the pintle within the orifice based on the first sensor data, the second sensor data, the vehicle data and a stored list of sensor data;

transmitting a signal to the motor for moving the pintle to the desired position within the orifice; and performing predefined diagnostic algorithms and transmitting results of the diagnostic algorithms to the ECU.

19. The regulator of claim 18, wherein the vehicle data from the ECU further comprises one or more of: throttle position sensor data, engine revolutions per minute data, accelerator pedal position sensor data, injection pulse width modulation, manifold absolute pressure and engine coolant temperature.

* * * * *